United States Patent
Nicolas et al.

(10) Patent No.: US 10,703,678 B2
(45) Date of Patent: Jul. 7, 2020

(54) ROLL COMPRISING AN ABRADABLE COATING

(71) Applicant: VESUVIUS FRANCE, S.A., Feignies (FR)

(72) Inventors: Jean-denis Nicolas, Feignies (FR); Gilbert Rancoule, Feignies (FR); Christian Berry, Feignies (FR)

(73) Assignee: Vesuvius France, S.A., Feignies (FR)

( * ) Notice: Subject to any disclaimer, the term of this patent is extended or adjusted under 35 U.S.C. 154(b) by 280 days.

(21) Appl. No.: 15/324,423

(22) PCT Filed: Jul. 8, 2015

(86) PCT No.: PCT/EP2015/065614
§ 371 (c)(1),
(2) Date: Jan. 6, 2017

(87) PCT Pub. No.: WO2016/005454
PCT Pub. Date: Jan. 14, 2016

(65) Prior Publication Data
US 2017/0158565 A1 Jun. 8, 2017

(30) Foreign Application Priority Data
Jul. 9, 2014 (EP) ................................. 14176297

(51) Int. Cl.
*C04B 35/584* (2006.01)
*B65G 39/07* (2006.01)
(Continued)

(52) U.S. Cl.
CPC .............. *C04B 35/584* (2013.01); *B05D 1/18* (2013.01); *B05D 3/007* (2013.01); *B05D 3/0254* (2013.01);
(Continued)

(58) Field of Classification Search
CPC .... C04B 35/584; C04B 35/597; C04B 35/565
See application file for complete search history.

(56) References Cited

U.S. PATENT DOCUMENTS 8,231,705 B2 * 7/2012 Uibel ..................... B22D 41/02
156/89.27
8,273,674 B2   9/2012 Champion et al.
(Continued)

FOREIGN PATENT DOCUMENTS

CN      103827351 A    5/2014
EA        012228 B1    8/2009
(Continued)

OTHER PUBLICATIONS

Database WPI, Week 199734, Thompson Scientific, London, GB; AN 1997-369295.

*Primary Examiner* — Liam J Heincer
(74) *Attorney, Agent, or Firm* — Thomas Clinton

(57) ABSTRACT

A protective and abradable coating composition is suitable for application on rolls and more particularly for application on conveyor rolls. The abradable coating is suitable for use in high temperature applications. Rolls incorporating the coating may be produced and used according to disclosed processes and procedures. Application of the composition to rolls reduces corrosion by aluminium melt, and enables the removal of built-up substances by friction. The life time of the roll is thereby increased.

11 Claims, 1 Drawing Sheet

(51) Int. Cl.
  *C04B 41/50*   (2006.01)
  *F27B 9/24*   (2006.01)
  *F27D 3/02*   (2006.01)
  *C04B 41/87*   (2006.01)
  *C04B 41/00*   (2006.01)
  *C03C 17/00*   (2006.01)
  *B21B 39/00*   (2006.01)
  *B21B 27/03*   (2006.01)
  *C03C 17/22*   (2006.01)
  *C04B 35/565*   (2006.01)
  *C04B 35/597*   (2006.01)
  *C04B 35/626*   (2006.01)
  *C09D 1/00*   (2006.01)
  *C23C 4/10*   (2016.01)
  *F16C 13/00*   (2006.01)
  *C23C 24/08*   (2006.01)
  *C09D 7/61*   (2018.01)
  *B05D 1/18*   (2006.01)
  *B05D 3/00*   (2006.01)
  *B05D 3/02*   (2006.01)
  *C08K 3/22*   (2006.01)
  *C08K 3/34*   (2006.01)
  *C08K 3/36*   (2006.01)
(52) U.S. Cl.
  CPC ........... *B21B 27/03* (2013.01); *B21B 39/008* (2013.01); *B65G 39/07* (2013.01); *C03C 17/007* (2013.01); *C03C 17/22* (2013.01); *C03C 17/225* (2013.01); *C04B 35/565* (2013.01); *C04B 35/597* (2013.01); *C04B 35/6263* (2013.01); *C04B 41/009* (2013.01); *C04B 41/5059* (2013.01); *C04B 41/5066* (2013.01); *C04B 41/5067* (2013.01); *C04B 41/87* (2013.01); *C09D 1/00* (2013.01); *C09D 7/61* (2018.01); *C23C 4/10* (2013.01); *C23C 24/082* (2013.01); *F16C 13/00* (2013.01); *F27B 9/2407* (2013.01); *F27D 3/026* (2013.01); *C03C 2217/42* (2013.01); *C04B 2235/3217* (2013.01); *C04B 2235/3225* (2013.01); *C04B 2235/3229* (2013.01); *C04B 2235/3234* (2013.01); *C04B 2235/3244* (2013.01); *C04B 2235/3418* (2013.01); *C04B 2235/5409* (2013.01); *C04B 2235/5445* (2013.01); *C08K 3/34* (2013.01); *C08K 3/36* (2013.01); *C08K 2003/2227* (2013.01); *C08K 2201/011* (2013.01); *F16C 2223/30* (2013.01)

(56) References Cited

U.S. PATENT DOCUMENTS

| | | | |
|---|---|---|---|
| 8,900,694 B2* | 12/2014 | Faber | C04B 41/5066 428/212 |
| 9,388,081 B2 | 7/2016 | Niveau et al. | |
| 9,625,213 B2 | 4/2017 | Uibel et al. | |
| 2002/0039959 A1* | 4/2002 | Yang | B24C 5/04 501/89 |
| 2007/0089642 A1 | 4/2007 | Engler et al. | |
| 2007/0232470 A1* | 10/2007 | Rancoule | C03B 35/186 492/30 |
| 2007/0238602 A1* | 10/2007 | Rancoule | C03C 14/00 501/102 |
| 2008/0260608 A1 | 10/2008 | Rancoule | |
| 2008/0292524 A1* | 11/2008 | Rancoule | C30B 11/002 423/349 |
| 2009/0160108 A1 | 6/2009 | Niveau et al. | |
| 2009/0263638 A1* | 10/2009 | Faber | B22C 3/00 428/220 |
| 2010/0107509 A1* | 5/2010 | Guiselin | B24D 3/00 51/298 |
| 2011/0110617 A1* | 5/2011 | Muramatsu | C04B 35/597 384/569 |
| 2011/0204382 A1* | 8/2011 | Traut | H01L 21/3121 257/77 |
| 2013/0260982 A1 | 10/2013 | Han et al. | |
| 2014/0272748 A1* | 9/2014 | Uibel | C30B 11/002 432/265 |

FOREIGN PATENT DOCUMENTS

| | | |
|---|---|---|
| GB | 815085 A | 6/1959 |
| GB | 2209528 A | 5/1989 |
| JP | H09157043 A | 6/1997 |
| JP | 2004291027 A | 10/2004 |
| JP | 2009537431 A | 10/2009 |
| JP | 2014525384 A | 9/2014 |
| KR | 20030089486 A | 11/2003 |
| RU | 2209193 C1 | 7/2003 |
| RU | 2462434 C2 | 6/2010 |
| RU | 2462435 C1 | 6/2011 |
| WO | 2005100810 A1 | 10/2005 |

* cited by examiner

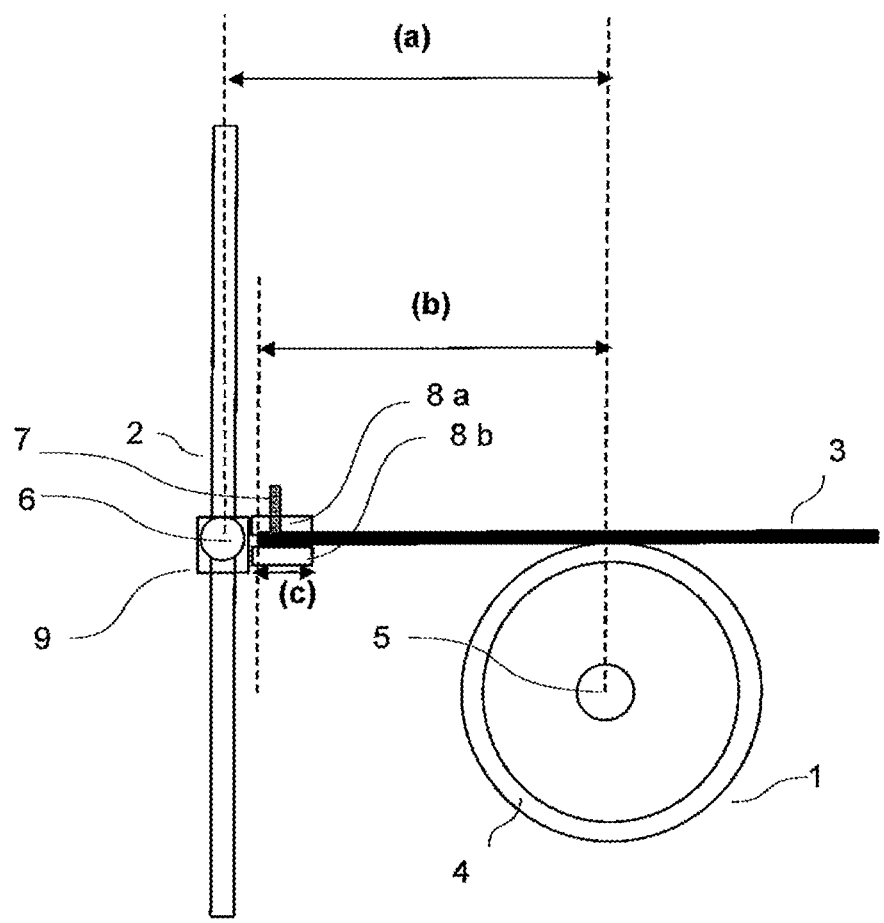

ROLL COMPRISING AN ABRADABLE COATING

BACKGROUND OF THE INVENTION (1) Field of the Invention

The present application relates to a protective and abradable coating composition for application on rolls and more particularly to conveyor rolls comprising an abradable coating for use at high temperature applications, to a composition for producing such coaling, to a process for making such rolls and to the use thereof.

(2) Description of the Related Art

Conveyed metal sheets are often treated against corrosion with aluminium or zinc alloys containing aluminium. Rolls made of materials comprised of fused silica, mullite, sillimanite, alumina, SiC matrix or metal such as refractory steel are well known for their excellent behavior at high temperature such as their high refractoriness and low thermal expansion and for their relative inertness with respect to molten metals. They are widely used in roller hearth furnaces. Although rolls containing silica are preferred, they present a drawback: while progressing in the furnace, the aluminum of coated metal sheets starts to melt. Partially melted aluminum reacts with $SiO_2$ or silicates issued from the ceramic roll body leading to aluminum oxidation ($Al \Rightarrow Al_2O_3$) and silicate reduction to metal form (mainly Si), reducing then drastically the life of the rolls due to corrosion.

It is known that, in order to prevent corrosion, rolls can be coated with SiAlON or with sintered silicon nitride or silicon carbide. The coating can further comprise particles of aluminium titanate. All these materials are indeed known to have non-wetting properties with respect to molten aluminium.

Even though the corrosion is reduced, some build-up phenomena still persist. By using a hard or durable silicon nitride coating, $Si_3N_4$ is slowly oxidized at the surface resulting in the formation of silica. Minor phases, such as silica coming from silicon nitride oxidation, react with aluminum producing $Al_2O_3$ and Si which accumulate on the coaled roll surface.

A hard coating disclosed in US-A1-2007/089642 comprises silicon nitride particles and a binder comprising surface-modified nanoscale solid particles in an organic solvent. The coating is described as hard due to the strong adherence of the nitride coating to the substrate. An organic solvent is used to avoid any hydrolysis of silicon nitride particles. This hard coating is usually applied on solar crucibles but can be also applied on riser tubes in aluminum metallurgy to prevent the aluminum corrosion.

US-A1-2009160108 describes fused silica roll without coating, where the surface porosity has been filled for example with silicon nitride using an organic solvent. This prevents to some extent the surface build-up. As fused silica is still the major phase on the surface, corrosion is also observed when in contact with aluminum.

BRIEF SUMMARY OF THE INVENTION

The object of the invention is to provide a roll which is resistant to aluminum corrosion and in addition which solves the build-up problem. The surface of the roller is coated but contrary to US-A1-2007/0089642, the coaling is not hard. In the present invention, the coating is abradable and is partially removed by wear together with the build-up substances leaving a clean surface while maintaining a good resistance to aluminium corrosion.

The present invention relates to a roll with at least a layer of an abradable coating comprising a) 83-98 wt % of an aggregate comprising particles of $Si_3N_4$, SiC or SiAlON or a mixture thereof,
b) 2-17 wt % of submicronic particles of $Al_2O_3$ or $SiO_2$, $ZrO_2$, $CeO_2$, $Y_2O_3$ or a mixture thereof.

The average particle size of submicronic particles is higher than 100 nm but lower than 1000 nm.

The aggregate can further comprise particles of $Al_2TiO_5$.

Such rolls are mainly used in a roll hearth furnace where the temperature of use is above 800° C. The $Si_3N_4$ particles of the coating tend to fall out by friction of the conveyed metal sheets on the roller when build-up of metal or metal oxide such as partially oxidized aluminum or alumina accumulate on the roll surface. The bonds between $Si_3N_4$ particles/$Si_3N_4$ particles, as well as the bonds between $Si_3N_4$ particles/substrate are indeed weak. After a certain time at high temperature (up to several weeks in the client's furnace), the cohesion between silicon nitride particles and the binder particles increases and the coating densifies but keeps its abradable properties. Nevertheless, the built-up substances are still peeled out because portion of the densified coating eventually peels out under the effect of friction. This is also the consequence of the friction of the metal sheets on the roll surface and the adherence at the interface between roll and densified coating which is weaker than the adherence at the interface between built-up substances and the densified coating. According to the concentration or the nature of the submicronic particles, the adhesion and cohesion with the substrate is further improved and despite the friction, the built-up substances do not fall down but remain on the roll. However—if necessary—these built-up substances can still be peeled out mechanically by an external action. The roll in this case must be dismantled and the built-up substances are then cleaned by applying sufficient friction. Another option is to remove completely the coating and re-apply a new coating to the roll.

The term abradable is used to describe a coating which is worn under the friction of the conveyed metal sheets or by applying an external action such as a grinding process. The consequence is that the coating's surface is self-regenerated and the life time of the roll is increased.

The coating optionally comprises a temporary binder such as an organic binder. The organic binder can be an acrylic or an epoxy polymer, starch, polyvinyl alcohol etc. The advantage of the organic binder is to increase on a temporary basis the mechanical properties needed for instance to transport and/or to install the roller without damage. Once the roller is used in the furnace, the organic binder disappears due to the high temperature leaving the roller with its abradable coating.

The specific surface area of the nitride particles is lower than or equal to 8 $m^2/g$ and may be between 0.5 and 5 $m^2/g$, or in the range from and including 0.5 $m^2/g$ to and including 8 $m^2/g$. If the specific surface area is higher than 8 $m^2/g$ cracks are observed due to stress generated during the drying of the coating. For example, a coating comprising particles having a specific surface area of 10 $m^2/g$ has been realized and the number of cracks was tremendously high to such extent that the coated article was not usable.

The use of several types of particles presenting different specific surface areas (also described as the use of a plurality of types of particles, each type of particle having a different specific surface area) permits to adapt coating density and properties by the optimization of powder stacking when the composition is applied on a substrate.

The invention further provides a roll wherein the abradable coating is made of a plurality of layers of compositions comprising
a) 83-98 wt % of an aggregate of particles of $Si_3N_4$, SIC or SiAlON or a mixture thereof,
b) 2-17 wt % of submicronic particles $Al_2O_3$ or $SiO_2$, $ZrO_2$, $CeO_2$, $Y_2O_3$ or a mixture thereof.

The aggregate can further comprise particles of $Al_2TiO_5$.

As the coating is removed under friction, the life service of the roll can be tailored according to the conditions used for the manufacturing of the coating.

In order to make the roll transportable, the coated roll may be heated at least at 800° C. for at least 3 hours.

The average thickness of the coating is advantageously at least 150 µm.

The abradable coating can be made by using a composition as described below. The object of the invention is also a composition for producing an abradable coating on a roll comprising
a) 50-75 wt % of an aggregate of particles of $Si_3N_4$, SIC or SiAlON or a mixture thereof
b) 1.5-10 wt %, or 1.5-5 wt % of submicronic particles of $Al_2O_3$ or $SiO_2$, $ZrO_2$, $CeO_2$, $Y_2O_3$ or a mixture thereof
c) 15-48.5 wt % $H_2O$,
characterized in that the particles of $Si_3N_4$, SIC or SiAlON have a specific surface area (BET) lower than or equal to 8 $m^2$/g, or between 0.5 and 5 $m^2$/g, or in the range from and including 0.5 $m^2$/g to and including 8 $m^2$/g.

The aggregate can further comprise particles of $Al_2TiO_5$ having a specific surface area (BET) lower than or equal to 8 $m^2$/g, or between 0.5 and 5 $m^2$/g, or in the range from and including 0.5 $m^2$/g to and including 8 $m^2$/g.

The optimization of grain distribution based on powder specific surface area allows tailored composition fluidity with high coating densities. The rolls are then easier to coat.

As the silicon nitride particles are suspended or dissolved in water, a hydrolysis of the surface particles is observed. This is indeed the reason why US-A1-2007/0089642 specifies that no water must be present in order to obtain a hard coating. The present inventors have however surprisingly observed that this hydrolysis creates an optimized chemical affinity of the grain surfaces toward binder, reducing significantly the need of binder, to achieve a minimum coating adherence to the substrate.

The average particle size of the submicronic particles such as $Al_2O_3$ or $SiO_2$, is higher than 100 nm. They are commonly used in the form of an aqueous colloidal solution. An aqueous colloidal solution is easy and safe to handle.

Another object of the invention is a process for manufacturing a roll comprising the steps of
a) providing a roll comprised of fused silica, mullite, sillimanite, alumina, SiC matrix or metal such as refractory steel having a core and a surface;
b) applying at least a portion of at least a surface of the article with the composition described above,
c) drying the roll,
d) optionally, heating the roll at 800° C. for at least 3 hours.

The coating is applied to the roll by spraying, dipping, flooding or plasma spraying the composition.

The rolls as described above can advantageously be used for transporting steel sheets treated with aluminum.

BRIEF DESCRIPTION OF THE DRAWING

FIG. 1 is a side view of a roll of the invention installed in a testing mechanism.

DETAILED DESCRIPTION OF THE INVENTION

The invention will be now illustrated by way of examples according to the invention and comparative example.

The abradable property is assessed by the wear resistance test and the scratch resistance. A minimum of scratch resistance is required to manipulate the roll without damages. In addition, the wear resistance should not be too low to ensure a minimum of lifetime of the coating but not too high, to allow the build-up substances to be removed by friction. It has been noticed by the inventors that the abradable property, results from a combination of the two resistance values.

The wear resistance is determined according to the following protocol. FIG. 1 depicts a side view of the testing conditions. A fused silica roll (1) of 50 mm length and with a diameter of 50 mm is weighed and then provided with a 200 µm coating (4) of the composition to be assessed. Once the coating (4) has dried (60° C. for 2 hours), the coated roll is weighted again and the coating weight determined.

The roll (1) is mounted on an axis (5) and a metal plate (3) (USIBOR1500 steel sheet of 200×100×1 mm, 150 g) retained horizontally between two legs (8a,8b) of 20(c)×60 mm on an axis (6) mounted perpendicularly to a support (2), is arranged to enter into tangential contact with the coated roll. The two axes (5) and (6) are parallel. The plate (3) is retained between the legs (8a,8b) by a bolt (7) so as not be displaced by the rotation of the roll. The plate is tilting progressively on the axis (6) as the coating is worn. The distance (a) between the axis (6) and the contact point plate (3)/coated roll is set to 150 mm. The distance (b) between the contact point plate (3)/coated roll and the end of the plate (3) closest to the support 2 is set to 125 mm. The roll is rotated at 220 r µm. The rotation is periodically interrupted and the remaining coating weight is determined. The operations are repeated until 30% by weight of the coating has been abraded.

A coating is marked (−−) if 30% by weight of the coating is worn in less than 250 minutes. A coating is marked (++) more than 500 minutes are required to wear 30% by weight of the coating. A coating is marked (+−) if 30% by weight of the coating is worn in a time comprised between 250 and 500 minutes.

The wear resistance represents the strength of the bond between coating components. Scratch resistance represents the adhesive strength to the substrate. It is the load (in Newton) required to scratch the coated surface. It was found surprisingly that scratch resistance can be relatively high while the wear resistance is low.

Below a value of 1 N, the adhesive strength is too weak. The coaling is damaged when the roll is transported or manipulated.

When the scratch resistance is higher than 7N, the coating is considered to have a strong adherence. The coating can however, still be abraded.

As examples, three compositions (Composition 1-3 used to produce examples 1 to 9) are made by mixing silicon nitride powders with a colloidal solution of $SiO_2$ or $Al_2O_3$ and water. The roll is then dipped in the composition solution and then dried at 60° C. for 2 hours. Examples of coating compositions are shown in table 1.

TABLE 1

|  | Composition 1 | Composition 2 | Composition 3 |
|---|---|---|---|
| $Si_3N_4$ wt % | 62 | 62 | 50 |
| Submicronic $SiO_2$ wt % | 3 | 0 | 0 |
| Submicronic $Al_2O_3$ wt % | 0 | 2 | 4 |
| Water wt % | 35 | 36 | 46 |

The rolls (examples 1-9) are then assessed in three different conditions.

Firstly (examples 1-3), the rolls are not submitted to further heat treatment than the drying temperature.

Secondly (examples 4-6), an organic binder is added in the coating composition at a concentration of 2 wt %. The rolls are dipped in the coating solution then dried and tested.

Thirdly (examples 7-9), the rolls-coaled using a composition comprising the organic binder—are healed at 800° C. for 3 hours.

As a comparative example (Example 10), a roll is coated with the composition described in US-A1-2008-260608. Because of the granulometry of the $Si_3N_4$ particles (the grains are mainly 1 micron), the coaling is formed by spaying. After a drying step, the roll is healed at 1000° C. for 3 hours. The composition is the following:

|  | Comparative sample Example 10 |
|---|---|
| $Si_3N_4$ wt % | 40 |
| Submicronic $SiO_2$ wt % | 10 |
| Water wt % | 45 |
| Polyvinyl alcohol | 5 |

The embodiments give the results shown in Table 2.

TABLE 2

|  | No heating | | | No heating/temporary organic binder | | | Heating 800° C. (3 h) | | | Firing 1000° C. (3 h) Comparative sample |
|---|---|---|---|---|---|---|---|---|---|---|
| Composition | 1 | 2 | 3 | 1 | 2 | 3 | 1 | 2 | 3 |  |
| Example | 1 | 2 | 3 | 4 | 5 | 6 | 7 | 8 | 9 | 10 |
| Wear resistance | -- | -- | -- | ++ | ++ | ++ | +- | -- | +- | -- |
| Scratch resistance (N) | <1 | <1 | <1 | >10 | >10 | >10 | 2 | 4.5 | 7 | <1 |

As can be observed in table 2, examples (1-3) which are not fired, have a low wear and scratch resistance. These coated are aluminium corrosion resistant but the rolls are not transportable.

Adding an organic binder to the composition increases the scratch and the wear resistance of all the compositions (Examples 4 to 6).

When heating the rolls at 800° C. for at least 3 hours (Examples 7 to 9), the organic binder disappears without damaging the silicon nitride layer. The wear resistance is slightly improved in comparison with non-heated rolls. With a weak wear resistance (--), the built-up substances will tend to fall with the silicon nitride particles when submitted to friction. Increasing the wear resistance (+/-) and the scratch resistance, built-up substances will tend to fall with isolated silicon nitride particles but also with the same forming a portion of coating. Higher value of scratch resistance can lead to more adherent built-up substances requiring then further strength to remove them.

A high scratch resistance allows to replace the roll without decreasing the furnace temperature which can be required when maintenance or roll replacement is needed. Despite the healing, the wear resistance and the scratch resistance values of the comparative sample are low (Example 10). The behaviour of this coating is completely different. The reason is that the particle size of the nitride particles is lower than 1 μm. Although the coating was heated at 1000° C., a roll with this coating cannot be used in this industrial application as the low wear resistance is leading to a highly abradable coaling. After a short time, no more coating remains on roll surface inducing appearance of build-up and corrosion of roll body.

Numerous modifications and variations of the present invention are possible. II is, therefore, to be understood that within the scope of the following claims, the invention may be practiced otherwise than as specifically described.

We claim:

1. Conveyor roll comprising a cylindrical exterior surface, wherein the conveyor roll comprises at least a layer of a coating, wherein the coating comprises
   a) 83-98 wt % of an aggregate comprising particles of a material selected from the group consisting of hydrolyzed $Si_3N_4$, SiC or SiAlON and a mixture thereof,
   b) 2-17 wt % of submicronic particles comprising a material selected from the group consisting of $Al_2O_3$, $SiO_2$, $ZrO_2$, $CeO_2$, $Y_2O_3$ and a mixture thereof, and
   wherein the coating is heated at a temperature of at least 800° C. for at least three hours.

2. Conveyor roll according to claim 1 wherein the aggregate further comprises particles of $Al_2TiO_5$.

3. Conveyor roll according to claim 1 wherein the specific surface area (BET) of the aggregate of particles is from and including 0.5 m²/g to and including 8 m²/g.

4. Conveyor roll according to claim 1 wherein the aggregate of particles comprises a plurality of types of particles, wherein each type of particle has a different specific surface area.

5. Conveyor roll according to claim 1 wherein the coating comprises a plurality of layers as described in claim 1.

6. Conveyor roll according to claim 1, wherein the average thickness of the coating is at least 150 μm.

7. Conveyor roll according to claim 1 wherein the conveyor roll comprises a material selected from the group consisting of fused silica, mullite, sillimanite, alumina, SiC matrix and metal.

8. Conveyor roll according to claim 1 wherein the coating comprises a temporary binder selected from the group consisting of acrylic polymer, epoxy polymer and polyvinyl alcohol.

9. Conveyor roll according to claim 1, wherein the conveyor roll comprises a single lateral radius.

10. Process for manufacturing a conveyor roll comprising the steps of:
   a) providing a roll made of a material selected from the group consisting of fused silica, mullite, sillimanite, alumina, SiC matrix and metal, wherein the roll comprises a core and a cylindrical exterior surface;
   b) applying on at least a portion of a surface of the roll, a composition comprising
      a) 50-75 wt % of an aggregate comprising particles of a material selected from the group consisting of hydrolyzed $Si_3N_4$, SiC, SiAlON and a mixture thereof,
      b) 1.5-10 wt % of submicronic particles comprising a material selected from the group consisting of $Al_2O_3$, $SiO_2$, $ZrO_2$, $CeO_2$, $Y_2O_3$ and a mixture thereof, and
      c) 15-48.5 wt % $H_2O$,
      characterized in that the particles of $Si_3N_4$, SiC, SiAlON and a mixture thereof have a specific surface area (BET) in the range from and including 0.5 $m^2/g$ to and including 8 $m^2/g$;
   c) drying the roll; and
   d) heating the roll at 800° C. for at least 3 hours.

11. Process according to claim 10 wherein the composition is coated by a process selected from the group consisting of spraying, dipping, flooding and plasma spraying.

* * * * *